UNITED STATES PATENT OFFICE.

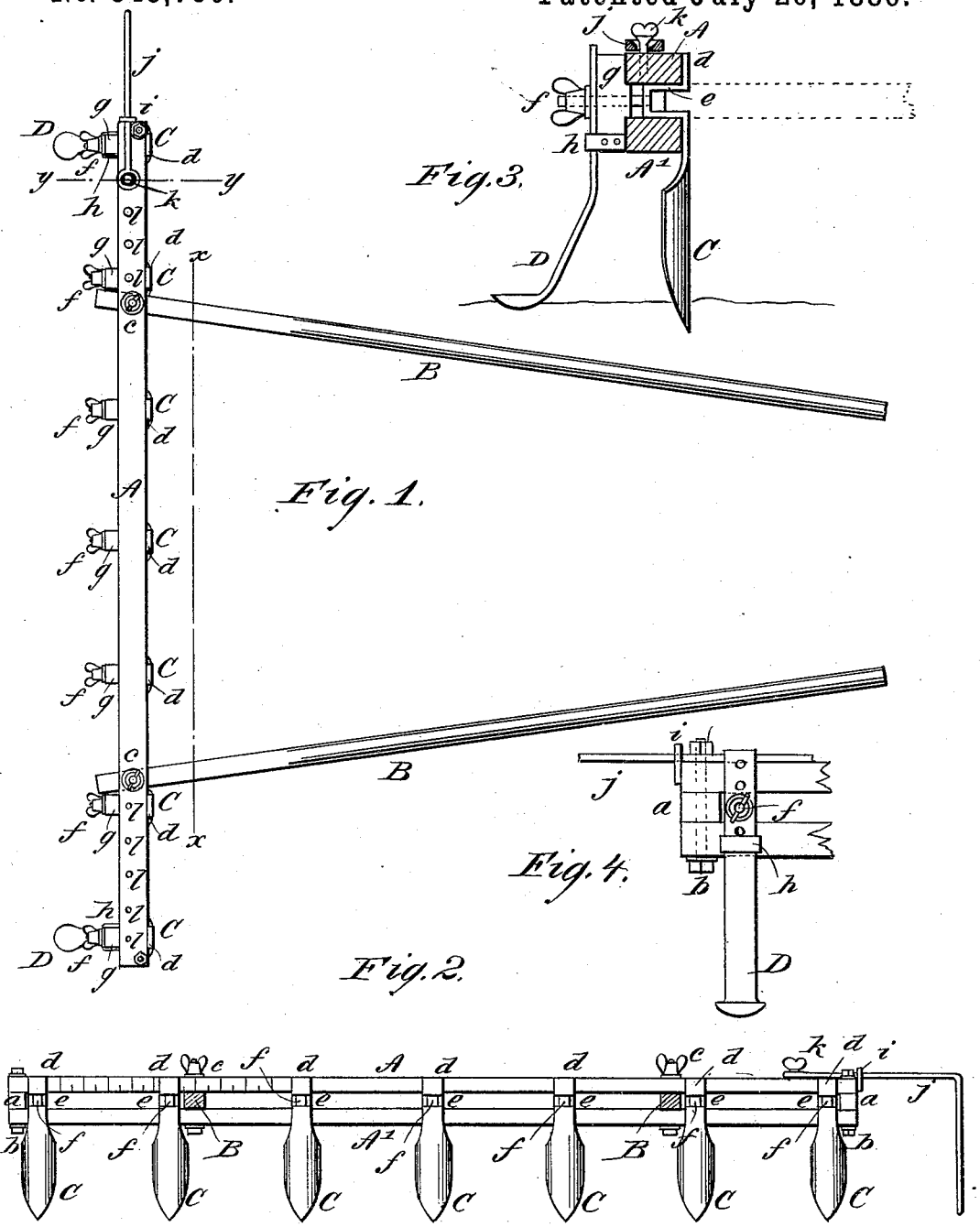

JOHN V. B. RAPP, OF NEW YORK, N. Y.

GROUND-MARKER.

SPECIFICATION forming part of Letters Patent No. 345,730, dated July 20, 1886.

Application filed October 8, 1885. Serial No. 179,339. (No model.)

*To all whom it may concern:*

Be it known that I, JOHN V. B. RAPP, of the city, county, and State of New York, have invented a new and Improved Ground-Marker, of which the following is a full, clear, and exact description.

The object of my invention is to provide an adjustable implement for marking tilled land in parallel rows for the reception of seed.

My invention consists in parallel bars provided with shafts, and in series of marking-teeth clamped to the parallel bars and adjustable along the length of the bars, to enable the implement to be used for marking for different kinds of seed.

My invention also consists in the combination, with the marker, of shoes for regulating the depth of the marks, and in a gage for regulating the distance between the series of marks made by the implement.

Reference is to be had to the accompanying drawings, forming part of this specification, in which similar letters of reference indicate corresponding parts in all the figures.

Figure 1 is a plan view of my improved marker. Fig. 2 is a front elevation taken in section on line $x\ x$ in Fig. 1. Fig. 3 is an enlarged transverse section taken on line $y\ y$ in Fig. 1; and Fig. 4 is a rear view of one end of the implement, showing the shoe for regulating the depth of the marking.

Two bars, A A′, of wood or other suitable material, clamped upon distance-pieces $a$ at the ends by bolts $b$ and upon the shafts B by removable bolts $c$, form the body of the marker. The shafts B, by which the marker is drawn forward and guided, may be removed from between the bars A A′, for convenience of storing or shipping, by taking out the bolts $c$. Series of teeth C, preferably made of iron or steel, form the marking-points of the implement. Each tooth C is provided with a shank, $d$, having a rectangular offset, $e$, which enters between the bars A A′, and is apertured to receive a bolt, $f$, which passes backward through a vertical cross-piece, $g$, and receives a wing-nut, by which the tooth and cross-piece are clamped in any desired position on the bars A A′. The vertical cross-piece $g$ is rabbeted to receive the edges of the bars A A′, to prevent the cross-piece from turning.

On two or more of the cross-pieces, preferably the end ones, are placed the shanks of the shoes D, which have several apertures for receiving the bolts $f$, which serve the double purpose of clamping the teeth and the shoes. To prevent the shanks of the shoes from turning on the bolts, the shanks of the shoes are embraced by staples or straps $h$, which are attached to the cross-pieces $g$.

Upon one end of the upper bar, A, is secured an eye, $i$, through which passes a rod, $j$, which extends along the upper surface of the bar A, and is secured by a thumb-screw, $k$, which passes through an eye in the end of the rod, and enters into one of several holes, $l$, in the bar A. The hole in the eye of the rod $j$ is slightly elongated and countersunk, as shown in Fig. 3, to admit of the turning of the rod within certain limits. The outer end of the rod $j$ is bent downward at right angles, and its downwardly-projecting arm is of about the same length as the teeth C.

The teeth C may be of any suitable form; but I prefer the form shown in the drawings—that is, with curved edges terminating in a marking-point, and with the plate of which the tooth is formed bent so as to present an outwardly-convex surface to the earth, with which the teeth are brought into contact as the marker is drawn forward.

The shanks of the shoes D are bent backward below the bars A A′, and the shoes having a convex under surface adapted to run in the furrows formed by the teeth in front of them.

The marker may be provided with any desired number of teeth placed at any desired distance apart, and the gage-rod $j$ is adjusted so that when it follows along the outside row of one series of marks the tooth near it will mark the first mark parallel with the first series and at a distance uniform with the other marks.

Instead of employing the shoe D to support the bars and the teeth carried thereby, I may employ a caster-wheel, which will serve substantially the same purpose; and to facilitate the adjustment of the teeth C upon the bars A A′, I may graduate one of the bars, as indicated in the drawings.

The depth of the marks will be gaged by the shoes D, so as to raise the points of the marker-teeth more or less, as may be required.

Having thus described my invention, what I claim as new, and desire to secure by Letters Patent, is—

1. In a ground-marker, the combination, with a frame formed of parallel bars A A' and distance-pieces a, of adjustable marking-teeth C, having offset shanks d, and removable shafts B, substantially as described.

2. The combination, in a ground-marker, of a frame provided with parallel bars A A', teeth C, having offset shanks d, the cross-pieces g, and bolts f, substantially as herein specified.

3. The combination of the teeth C, having offset shanks d, the bars A A', cross-pieces g, bolts f, shoes D, having apertured shanks, and the straps h, as herein specified.

4. In a ground-marker, the combination, with the tooth-supporting frame provided with series of holes l in the upper part thereof, of the eye i, secured to the end of the frame, the right-angled rod j, passing through the eye i, and provided with a countersunk eye in one end thereof, and the screw k, passing through the countersunk eye, with one of the holes l in the frame of the marker, substantially as herein specified.

JOHN V. B. RAPP.

Witnesses:
EDGAR TATE,
EDWD. M. CLARK.